(12) United States Patent
Harris et al.

(10) Patent No.: US 8,163,138 B2
(45) Date of Patent: Apr. 24, 2012

(54) METHOD FOR PROCESSING EFFLUENT FROM CHLOROMETHYLATION OF VINYL AROMATIC POLYMERS

(75) Inventors: William I. Harris, Midland, MI (US); Bruce S. Holden, Midland, MI (US); Doreen C. Keptner, Midland, MI (US); David C. McDonald, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1371 days.

(21) Appl. No.: 11/805,475

(22) Filed: May 23, 2007

(65) Prior Publication Data

US 2008/0289949 A1 Nov. 27, 2008

(51) Int. Cl.
*B01D 3/34* (2006.01)
*C08F 8/24* (2006.01)
*C08F 12/18* (2006.01)

(52) U.S. Cl. ........... 203/37; 203/73; 203/80; 525/359.3; 568/682

(58) Field of Classification Search .................... 203/37, 203/73, 80; 525/359.3; 568/682, 697
See application file for complete search history.

(56) References Cited

U.S. PATENT DOCUMENTS

| | | | |
|---|---|---|---|
| 3,176,842 A | 4/1965 | Fry | |
| 3,995,094 A | 11/1976 | Crosby et al. | |
| 4,192,921 A | 3/1980 | Dales | |
| 4,224,415 A | 9/1980 | Meitzner et al. | |
| 4,225,677 A * | 9/1980 | Boutier et al. | 521/31 |
| 4,246,386 A | 1/1981 | Howell et al. | |
| 4,283,499 A | 8/1981 | Howell | |
| 4,419,245 A | 12/1983 | Barrett et al. | |
| 4,568,700 A | 2/1986 | Warshawsky | |
| 4,636,554 A | 1/1987 | Tada et al. | |
| 4,900,796 A | 2/1990 | Berger et al. | |
| 5,231,115 A | 7/1993 | Harris | |
| 5,600,022 A | 2/1997 | Ando et al. | |
| 6,290,854 B1 | 9/2001 | Stahlbush et al. | |
| 6,756,462 B2 | 6/2004 | Pafford et al. | |

FOREIGN PATENT DOCUMENTS

| | | |
|---|---|---|
| DE | 27643 | 3/1964 |
| GB | 1162078 | 7/1968 |
| JP | 60137908 | 7/1985 |
| RO | 79140 | 6/1982 |

OTHER PUBLICATIONS

PCT/US2008/059194 International Search Report and Written Opinion.
Griffin D. Jones, Chloromethylation of Polystyrene, vol. 44, 2686-2693.

* cited by examiner

Primary Examiner — Virginia Manoharan
(74) Attorney, Agent, or Firm — Edward W. Black

(57) ABSTRACT

A method for processing effluent from a chloromethylation of a vinyl aromatic polymer wherein the effluent includes catalyst and volatile organics, and wherein the method includes the steps of:
1) deactivating at least a portion of the catalyst;
2) distilling the effluent;
3) adding caustic to the effluent; and
4) distilling the effluent.

13 Claims, No Drawings

METHOD FOR PROCESSING EFFLUENT FROM CHLOROMETHYLATION OF VINYL AROMATIC POLYMERS

BACKGROUND OF THE INVENTION (1) Field of the Invention

The present invention is directed toward methods for processing effluent from the chloromethylation of vinyl aromatic polymers, including the use of distillation to remove and/or recover volatile organics.

(2) Description of the Related Art

Chloromethylation of vinyl aromatic polymers is a common industrial process involving an addition of a chloromethyl (—$CH_2Cl$) functional group to an aromatic ring of a vinyl aromatic polymer. The reaction is generally conducted by combining a vinyl aromatic polymer (e.g. a styrene-divinylbenzene copolymer) with a chloromethylation reagent (e.g. chloromethyl methyl ether) in the presence of Lewis acid catalyst (e.g. ferric chloride). The reaction product is a chloromethylated vinyl aromatic polymer which is useful in a variety of commercial applications including use as an intermediate in the production of anion exchange resins.

The reaction product mixture ("effluent") from such chloromethylation reactions typically comprises catalyst, hydrochloric acid, and non-volatile organics. The effluent also includes valuable and/or environmentally sensitive constituents including volatile organics such as chloromethyl methyl ether (CMME), methylal, formaldehyde and methanol. In many processes, a portion of the volatile organics are recovered from the effluent. For example, U.S. Pat. No. 4,568,700 describes a method including filtering the chloromethylated polymer product from the effluent followed by treatment of the effluent by addition of hydrochloric acid to deactivate the catalyst and the subsequent addition of water. Alcohol is recovered from the resulting effluent via distillation or dialysis. Similarly, an abstract of Romanian Patent No. 79140 describes the addition of hydrochloric acid and formaldehyde to the effluent followed by distillation to recover a fraction having a boiling point (bp) of from 35 to 105° C. By way of another example, Japanese Patent Publication No. 61204/1987 (as described in U.S. Pat. No. 5,600,022, comparative example 1) describes the addition of hydrochloric acid to effluent followed by distillation at 98° C. under standard atmospheric pressure.

U.S. Pat. No. 4,636,554 describes the addition of 20 to 35% hydrochloric acid to chloromethylation effluent to suppress hydrolysis of CMME along with deactivating the catalyst. The effluent is then distilled to recover CMME along with other volatile organics such as methanol, methylal and formaldehyde. The distillation is usually conducted under conditions such that the dispersing medium, i.e. water or high boiling organic solvent is not distilled. This reference also describes an alternative addition of hydrogen chloride gas rather than hydrochloric acid. As hydrogen chloride gas does not deactivate the catalyst, a basic substance is added. The remaining effluent (distillation residue) includes significant amounts of volatile organics including both CMME and methanol.

As yet another example, U.S. Pat. No. 4,900,796 describes a chloromethylation process including the in-situ generation of CMME by the addition of methanol, formaldehyde and hydrochloric acid to the effluent. CMME is distilled from the resulting effluent mixture at atmospheric or mild vacuum pressure up to 70° C. followed by reduced vacuum (i.e. 300 mm to 600 mm). Reclaimed CMME is recycled for use in subsequent chloromethylation reactions.

U.S. Pat. No. 6,756,462 describes the use, recycle and reuse of sulfuric acid in an in-situ chloromethylation reaction of vinyl aromatic polymers. The reference describes the effluent from the reaction including a mixture of sulfuric acid, unreacted CMME, methanol, water, ferric chloride, methylal and other reaction byproducts including iron sulfate complexes, oligomers of formaldehyde and polystyrene derivatives.

British Patent No. 1,162,078 describes an earlier process including the pre-treatment of effluent with soda to form carbonate precipitates, followed by distillation to recover organic substances. The distillation was apparently difficult due to the formation of formaldehyde condensation products (i.e. fouling) of the plates of the distillation column resulting in lower yields. The reference also describes an "improved" process for recovering volatile organics from the effluent including the step of adding methanol prior to fractional distillation for the purpose of increasing recovery of methylal and methanol. The still bottoms remaining after the distillation are heated to carbonize organic impurities, the solids are then separated from the effluent and the remaining solution is evaporated to recover chlorides. Contrary to its teaching, the disclosed conditions for carbonizing organic impurities (i.e. heat the material to temperatures from 100 to 150° C.) more likely crosslinks and precipitates the chloromethylated extracted polymer residue. That is, the temperatures described are believed to be insufficient for carbonization and more likely result in the formation of an insoluble organic tar that is difficult to filter and readily fouls distillation equipment. Example 1 describes a recovery of 92 to 95% of methylal and methanol; however, it appears the recovery values were based upon the assumption that all CMME is converted to methylal and the remaining methylal and methanol being recoverable. It is more likely that a portion of CMME reacts with methanol according to Equation 1.

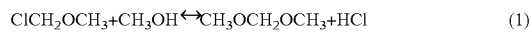

$$ClCH_2OCH_3 + CH_3OH \leftrightarrow CH_3OCH_2OCH_3 + HCl \qquad (1)$$

Thus, it appears that the loss in weight due to formation of hydrogen chloride was ignored in the recovery calculation. When hydrogen chloride is considered, recovery values drop significantly from those reported.

U.S. Pat. No. 5,600,022 describes an undesired result of earlier processing methodologies that include the addition of hydrochloric acid followed by distillation. More specific, this reference provides that, CMME in the presence of concentrated hydrochloric acid under heating conditions for distillation results in undesired side reactions including the conversion of CMME (and methanol and formaldehyde) to methyl formate and methyl chloride. The reference goes on to describe an alternative method including the addition of hydrochloric acid and an extraction solvent followed by hydrogen chloride gas. The resulting organic and aqueous layers are then separated. By utilizing solvent extraction rather than distillation, the formation of methyl formate and methyl chloride are reduced. The CMME is finally separated from the organic layer via distillation, membrane separation, solvent extraction or chromatographic separation.

Each of the aforementioned references are incorporated herein in their entirety.

Despite the use of recycle loops and/or various separation techniques at least a portion of the effluent remaining from the chloromethylation must ultimately be disposed of. This is most typically accomplished via conventional waste water treatment. Environmental regulations are imposing increasingly demanding recovery limits for volatile organics in effluent. For example, title 40 of the US Code of Federal Regulations (40 CFR 63, subpart FFFF) establishes new standards for methanol emissions effective in 2008. While traditional distillation techniques remove a majority of volatile organics from chloromethylation effluent, the use of higher distillation temperatures (e.g. near or in excess of about 80° C. at standard atmospheric pressure) sufficient to remove greater quantities of volatile organics often leads to fouling of the distillation equipment with non-volatile organic materials (i.e. organic tars) and catalyst. Removal of such foulants from distillation equipment is difficult and imposes a practical limit on distillation techniques. Thus, new methodologies are sought which are capable of removing high quantities of volatile organics from effluent without the deleterious fouling of distillation equipment.

BRIEF SUMMARY OF THE INVENTION

The present invention is a method for processing effluent from the chloromethylation of vinyl aromatic polymers. The method comprises a multi-step distillation process including the addition of caustic to the effluent. An objective of the present invention is to remove a high percentage of volatile organics from the effluent while reducing fouling of distillation equipment. Many additional embodiments, objectives, advantages and features are also disclosed.

DETAILED DESCRIPTION OF THE INVENTION

The present invention is not particularly limited with respect to vinyl aromatic polymers, chloromethylation agents, catalysts or chloromethylation techniques. That is, the present invention is broadly applicable to the processing of effluent resulting from a broad range of chloromethylation reactions of vinyl aromatic polymers. Moreover, the present invention can be used in combination with known effluent treatment methodologies including the direct recovery and recycling of CMME from distillate for use in subsequent chloromethylation reactions.

As used herein, the term "polymer" is intended to include homopolymers and copolymers (i.e. polymers derived from two or more different monomers), but copolymers are preferred. A representative class of applicable vinyl aromatic polymers are described in U.S. Pat. No. 6,756,462, which is incorporated in its entirety by reference. Such polymers are typically prepared by polymerizing vinyl aromatic monomers through suspension polymerization. Examples of such monomers include monounsaturated vinyl aromatic monomers such as: styrene, vinyltoluene, vinyixylene and $C_1$-$C_4$ alkyl substituted styrene and vinyl naphthalene (e.g. α-methylstyrene ethylvinylstyrene, isopropylstyrene, diethylstyrene, ethymethylstyrene, and dimethylstyrene) and mixtures thereof. Optionally, non-aromatic co-monomers may also be used including aliphatic unsaturated monomers such as: vinyl chloride, acyrlonitrile, methacrylonitrile and $C_1$-$C_4$ alkyl esters of (meth)acrylic acids (such as methyl acrylate). When used, the non-aromatic monomers typically comprise from about 0 to 20 weight percent based on the total monomer weight used to form the polymer. The subject polymers are preferably crosslinked. Crosslinking is generally accomplished by including a multifunctional aromatic monomer such as divinylbenzene, trivinylbenzene, divinyltoluene, divinylpyridine, divinylnaphthalene and divinylxylene. When used, such crosslinking monomers comprise from about 0.1 to 20, preferably about 0.5 to 10 weight percent based on the total monomer weight used to form the polymer. Divinylbenzene is the preferred crosslinking monomer. Non-aromatic crosslinking monomers may also be used, including but not limited to: ethyleneglycol diacrylate, ethyleneglycol dimethacrylate, trimethylol-propane, triacrylate, trimethylol-propane trimethacrlyate, diethyleneglycol divinyl ether, trivinylcyclohexane, 1,5-hexadiene, 2,5-dimethyl, 1,5-hexadiene, 1,7-octadiene and triallyl isocyanurate. A preferred vinyl aromatic polymer is a copolymer of styrene, ethylvinylstyrene and divinylbenzene comprising from about 0.1 to 20 weight percent divinylbenzene monomer and a majority portion (e.g. typically more than about 50 weight percent) of styrene monomer based on the total monomer weight used to form the polymer.

Vinyl aromatic polymers may be prepared using free-radical initiators, including monomer-soluble initiators such as azo-compounds (e.g. azobisisobutyronitrile) organic peroxides (benzoyl peroxide), hydroperoxides and related initiators as described in U.S. Pat. Nos. 4,192,921; 4,246,386; 4,283,499 and 6,756,462—each of which is incorporated herein by reference. Suitable dispersants and suspension stabilizers may also be used such as gelatin, polyvinyl alcohol, magnesium hydroxide, hydroxyethylcellulose, carboxy methyl methylcellulose and others as described in U.S. Pat. No. 4,419,245 incorporated herein by reference.

The crosslinked copolymer species of the subject vinyl aromatic polymers are preferably prepared by suspension polymerization of a finely divided organic phase comprising two or more of the aforementioned monomers (preferably including a multifunctional monomer functioning as a crosslinker), a free-radical initiator and optionally a phase-separating diluent. Phase-separating diluents are solvents for the monomers of the reaction but not the resulting copolymer. As such, the copolymer precipitates from the monomer phase as it is formed. Suitable phase-separating diluents are organic solvents which are substantially inert with respect to the suspending medium, monomers and resulting copolymer. Generally, organic solvents having boiling points of at least about 60° C. are suitable including: aliphatic hydrocarbons, halogenated hydrocarbons and aliphatic alcohols. Specific examples including hexane, heptane, iso-octane, benzene, tert-amyl alcohol and n-butanol. Further examples are provided in U.S. Pat. Nos. 6,290,854; 4,224,415; and 3,176,482 which are each incorporated herein by reference. The resulting crosslinked copolymers may be microporous, i.e. gellular, or macroporous depending upon whether a phase-separating diluent is utilized. The term "macroporous", "microporous" and/or "gellular" are well known in the art and refer to the nature of the copolymer porosity. Microporous or gellular copolymers have pore sizes on the order of less than about 20 Angstroms (Å), while macroporous copolymers typically have both mesopores of from about 20 Å to about 500 Å and macropores of greater than about 500 Å. Gellular and macroporous copolymers as well as their preparation are described in U.S. Pat. Nos. 5,231,115 and 4,256,840, both of which are incorporated herein in their entirety by reference.

Chloromethylation of vinyl aromatic polymers is well known in the art. By way of example, a simplified reaction is depicted in Equation 2 wherein the term "vinyl" represents a portion of the polymer backbone, "Ar" represents a pendant aromatic ring and the combination represents a polymer repeating unit shown in brackets.

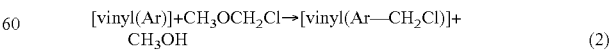

$$[vinyl(Ar)] + CH_3OCH_2Cl \rightarrow [vinyl(Ar\text{—}CH_2Cl)] + CH_3OH \quad (2)$$

For purposes of the present invention, the specific means and conditions for chloromethylating vinyl aromatic polymer(s) is not particularly limited and many applicable techniques are documented in the literature. Chloromethylation is typically conducted by combining the vinyl aromatic polymer with a chloromethylation reagent in the presence of a catalyst at a temperature of from about 15 to 100° C., preferably 35 to 70° C. for about 1 to 8 hours. The most common and preferred chloromethylation reagent is chloromethyl methyl ether (CMME) and/or CMME-forming reactants such as the combination of formaldehyde, methanol and hydrogen chloride or chlorosulfonic acid, or hydrogen chloride with methylated formalin which are typically combined with the polymer in an amount of from about 0.5 to 20, preferably about 1.5 to 8 mole of CMME per mole of vinyl aromatic polymer. While less preferred, other chloromethylation reagents may be used including but not limited to: bis-chloromethyl ether (BCME), BCME-forming reactants such as formaldehyde and hydrogen chloride, and long chain alkyl chloromethyl ethers as described in U.S. Pat. No. 4,568,700.

Catalyst useful for conducting chloromethylation reactions are well known and are often referred to in the art as "Lewis acid" or "Friedel-Crafts" catalyst. Nonlimiting examples include: zinc chloride, zinc oxide, ferric chloride, ferric oxide, tin chloride, tin oxide, titanium chloride, zirconium chloride, aluminum chloride and sulfuric acid along with combinations thereof. Halogens other than chloride may also be used in the preceding examples. A preferred catalyst is ferric chloride. The catalyst is typically used in an amount corresponding to about 0.01 to 0.2, preferably from about 0.02 to 0.1 mole catalyst per mole of vinyl aromatic polymer repeating unit. Catalyst may be used in combination with optional catalyst adjuncts such as calcium chloride and activating agents such as silicon tetrachloride. More than one catalyst may be used to achieve the desired chloromethylation reaction profile.

Solvents and/or swelling agents may also be used in the chloromethylation reaction. Examples of suitable solvents including but are not limited to one or more of: an aliphatic hydrocarbon halides such as ethylene dichloride, dichloropropane, dichloromethane, chloroform, diethyl ether, dipropyl ether, dibutyl ether and diisoamyl ether. When CMME is used as the chloromethylation agent, such solvents and/or swelling agents are often neither desired nor necessary.

As previously mentioned, chloromethylated vinyl aromatic polymers are commonly used as intermediates in the production of anion exchange resins. In such applications, the chloromethylated vinyl aromatic polymer is typically filtered from the effluent, washed (e.g. with methanol, methylal, water), and reacted with an amine (e.g. trimethylamine, dimethylethanolamine, dimethylamine, etc.) to produce an anion exchange resin. A simplified reaction is depicted in Equation 3.

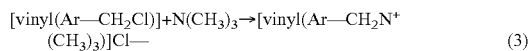
(3)

The resulting ion exchange resin may be gellular or macroporous and are commonly used as weak base and strong base ion exchange resins.

Upon completion of the chloromethylation reaction, the reaction product mixture ("effluent") typically comprises volatile organics including one or more but usually a combination of: chloromethylation reagent (e.g. CMME), methanol, methylal (dimethoxymethane), formaldehyde formic acid, and methyl formate. As used herein, the term "volatile organics" means carbon-containing compounds having a boiling point temperature under standard atmospheric conditions (bp) of less than about 100° C., preferably less than about 80° C., and more preferably less than about 70° C. In addition to such volatile organics, the effluent also typically includes non-volatile organics. The term "non-volatile organics" is intended to mean carbon-containing compounds having a boiling point at standard atmospheric conditions above about 100° C., preferably above about 120°, and more preferably above about 160° C. Examples of such non-volatile organics include paraformaldehyde and organic tars, e.g. aromatic and aliphatic polymers and/or oligomers having molecular weights typically from 100 to over 20,000 Daltons. Such organic tars are generally considered non-volatile and are not typically characterized in terms of boiling points. In addition to volatile and non-volatile organics, the effluent also commonly includes other constituents such as water, catalyst and spent catalyst. The term "spent catalyst" refers to a catalyst that has undergone a chemical modification resulting in a substantial reduction of its catalytic function (with respect to the originally intended reactants and reactions conditions). For example, ferric chloride is often deactivated by reaction with water resulting in the formation of relatively non-reactive hydrated ferric chloride and other iron complexes.

The present invention includes a method for processing effluent from a chloromethylation of a vinyl aromatic polymer comprising the following steps:
1) deactivating at least a portion of the catalyst;
2) distilling the effluent;
3) adding caustic to the effluent; and
4) distilling the effluent.

The steps of the present method are generally conducted in a sequential manner; however, the timing (e.g. initiation, completion) of any two adjacent (sequential) steps may overlap with one another, or in some embodiments may be conducted concurrently. For example, the catalyst deactivation step 1) may be conducted concurrently with the first distillation step 2). Similarly, the caustic addition step 3) may be conducted concurrently with the first distillation step 2) and/or the second distillation step 4).

The step of deactivating the catalyst is not particularly limited and may be accomplished via a variety of techniques known in the art; however, this step is preferably accomplished by the addition of at least one of the following constituents ("deactivating reagents") to the effluent: hydrochloric acid, methanol and water. In a preferred embodiment, catalyst deactivation is accomplished by the addition of an aqueous solution comprising from about 1 to 40 weight percent hydrochloric acid. The source of the hydrochloric acid may be from the production of CMME, in which case the concentration may vary but is nonetheless typically considered "concentrated", i.e. above about 30 weight percent. While less preferred, lower concentrations may also be used, e.g. from about 5 to 30 weight percent hydrochloric acid. The water of the solution serves to deactivate at least a portion of the catalyst and in at least one embodiment, the addition of hydrochloric acid reduces the hydrolysis of the volatile organics (e.g. CMME) in the effluent, thus leading to higher total volatile organic recoveries in subsequent distillation. This is depicted in Equation 4.

(4)

The amount of deactivating reagent added to the effluent should be sufficient to deactivate at least a portion of the catalyst, but is preferably sufficient to deactivate a majority portion of the catalyst. In a preferred embodiment, the quantity of deactivating reagent added to the effluent may be calculated to be approximately equal to or greater than the stoichiometric amount necessary to react with the catalyst. Typically, a molar ratio of deactivating reagent to catalyst of about 2 or greater is sufficient. For example, when ferric chloride is used as a catalyst, the addition of water (preferably added as concentrated hydrochloric acid in order to avoid the reaction shown as Equation 4) in a molar ratio of about 2 to about 3 moles of water per mole of ferric chloride may be sufficient; however, much higher molar ratios (e.g. above 10 and even above about 100) may also be used.

The failure to deactivate at least a portion, (but preferably at least a majority portion) of the catalyst prior to the first distillation can lead to a variety of undesired effects including the production of undesired organic products. For example, the temperature associated with distillation can lead to the reaction products as shown in Equations 5 & 6.

$$CH_3OH+HCl \rightarrow CH_3Cl+H_2O \tag{5}$$

$$2CH_3OH \rightarrow CH_3OCH_3+H_2O \tag{6}$$

Moreover, the failure to deactivate the catalyst is also believed to increase crosslinking of non-volatile organics, particularly at temperatures of distillation. Such crosslinking is believed to include both crosslinking reactions within macromolecules and between macromolecules. Crosslinked non-volatile organics are believed to contribute to fouling of distillation equipment. The term "fouling" is intended to describe the accumulation of deposits on distillation equipment which can lead to inefficient or inoperable separations. The "foulant" material typically comprises organic tars including mixtures of aromatic and aliphatic species having molecular weights from about 100 to over 20,000 Daltons. Furthermore, the failure to deactivate catalyst is also believe to increase the loss of raw, materials as depicted in Equations 7 and 8.

$$CH_2O+H_2O+2FeCl_3 \rightarrow HCOOH+2HCl+2FeCl_2 \tag{7}$$

$$HCOOH+CH_3OH \rightarrow HCOOCH_3+H_2O \tag{8}$$

Most typically, after at least a portion of the catalyst (preferably at least a majority portion) has been deactivated, the effluent is distilled under conditions to remove at least a portion of the volatile organics. The term "distillation" is used herein in its broadest sense, i.e. the separation of chemical substances based upon their volatilities. The techniques and devices for accomplishing the separation are not particularly limited and include conventional batch, continuous, fractional and steam distillations; evaporations, and stripping and rectifying operations, which may be used alone or in combination in multiple phases. As used herein, the phrase "distillation temperature" refers to the highest sustained temperature within the distillation circuit but does not include temporary temperature flare ups or transient "hot spots". Depending upon the distillation set up, heat may be provided in along the column, such as via steam or an external column heating device and/or may be provided via the still or pot via reflux heating.

In one embodiment of the present invention, the first distillation is conducted under relatively mild conditions (with deactivated catalyst) to limit decomposition of CMME (bp≈56° C.) and methylal (bp≈42° C.) to undesired products such as methyl formate, methyl chloride, and dimethylether. Distillation temperatures are typically from about 40 to 80° C., generally less than about 80° C., preferably less than about 70° C. and more preferably less than about 65° C. In a preferred embodiment, the first distillation step comprises a multi-stage process comprising a first evaporation conducted under standard atmospheric pressure and at a temperature up to about 60° C. followed by one or more subsequent evaporations conducted at reduced pressures from about 10 to 90 kPa, preferably from about 40 to 80 kPa at a distillation temperature less than about 60° C. and more preferably in the range of about 45 to 55° C. In one embodiment, the first distillation step is conducted with one or more evaporators, such as a rotary vacuum evaporator or forced-circulation vacuum batch evaporator. In many embodiments, the first distillation step is conducted under conditions to preferentially remove CMME and/or methylal which can be recycled for use in other reactions requiring such starting materials. Depending upon the specific composition of the effluent, methanol may be added to the effluent prior to completion of the first distillation step (e.g. after initiating distillation but prior to final completion). Methanol reacts with formaldehyde to form methylal which is much easier to remove from aqueous mixtures via distillation; that is, formaldehyde forms an azeotrope with water making separation via distillation more difficult.

As previously described, at least a portion and preferably the majority of the catalyst is deactivated prior to the first distillation. However, it will be appreciated that a portion of the catalyst may be deactivated during the first distillation step. While less preferred, in one embodiment of the invention at least a portion of the step of deactivating the catalyst and the first distillation step are conducted concurrently, i.e. the timing of the steps overlap. For example, the deactivating reagent may be added to the effluent during the first distillation step, particularly at the beginning of distillation. That is, to reduce potential undesired reaction products (see Equations 5 & 6), crosslinking reactions, and/or loss of raw materials (see Equations 7 & 8), in such an embodiment it is preferred that at least a portion and preferably majority of the catalyst is deactivated during the beginning phase of the first distillation step.

Preferably, after the first distillation step caustic is added to the remaining effluent (i.e. that portion not distilled from the first distillation). As used herein, the term "caustic" comprises: sodium hydroxide (caustic soda), potassium hydroxide (caustic potash), and/or calcium hydroxide (caustic lime), but preferably sodium hydroxide. Caustic is preferably added to the effluent in the form of an aqueous solution comprising from about 5 to 50 weight percent, more preferably about 10 to 30 weight percent caustic, in sufficient quantity to raise the initial pH of the effluent to at least about 5, more preferably at least about 8, and still more preferably at least about 10 (e.g. from about 10 to about 12). The term "initial pH" means the pH of the effluent about 5 to 15 minutes after the addition of caustic. Depending upon the chemical composition of the effluent, the pH of the effluent may drift lower over time. For example, ferric oxides may undergo hydrolysis and generate acid which will lower the pH of the effluent over time. Preferably, the addition of caustic is sufficient to neutralize the majority of the acid initially present in the effluent (but not necessarily acid that subsequently forms) along with deactivating at least a portion of catalyst that was not previously deactivated. Excess caustic may be added to keep the effluent at a basic conditions, e.g. greater or equal to a pH of 10.

The addition of caustic prior to the first distillation may lead to undesired reactions between the chloromethylating agent and caustic forming formaldehyde, as shown in Equation 9.

$$NaOH+ClCH_2OCH_3 \rightarrow CH_2O+CH_3OH+NaCl \tag{9}$$

Consequently, in preferred embodiments, caustic is added to the effluent during or after the first distillation but typically not before. In yet another alternative embodiment described below, caustic is added to the effluent during a second distillation step.

After the first distillation step, the effluent is subjected to a second distillation step. The second distillation is advantageously conducted under more aggressive conditions than the first distillation in order to remove additional volatile organics. In a preferred embodiment, a majority portion of CMME and methylal have been previously removed from the effluent during the first distillation step. Thus, there is less concern of decomposition of CMME and methylal—both of which have relatively low boiling point temperatures. In one embodiment, the second distillation step is conducted at a distillation temperature above 80° C. That is, in distinction to a preferred embodiment of the first distillation step, the second distillation step includes at least a portion of time at distillation temperatures above about 80° C. In a specific embodiment the second distillation step is conducted via a top (gravity) feed, continuous steam stripping process at distillation temperatures, up to about 100° C., and in some embodiments up to about 105° C., 110° C., and even 120° C. or higher. In one preferred embodiment, the operating conditions are optimized to maximize methanol (bp≈65° C.) recovery while minimizing water in the distillate so as to avoid unnecessary energy consumption. Under such conditions, the distillation may be conducted under standard atmospheric conditions at a distillation temperature less than about 120° C., preferably less than about 110° C. and more preferably less than about 105° C. However, in order to further minimize the distillation of water, distillation temperatures may be maintained under about 100° C. Of course if the distillation of water is not a concern, higher distillation temperatures may be used. The equipment and operating conditions for conducting such distillation are well known in the art.

In a preferred embodiment, the second distillation step is conducted under conditions to lower the total volatile organic content of the effluent to less than about 10 weight percent, preferably less than about 8 weight percent, more preferably less than about 5 weight percent, and still more preferably less than 3 weight percent. In another preferred embodiment, the second distillation step is conducted under conditions to lower the methanol content of the effluent to less than about 3 weight percent, preferably less than about 1 weight percent, and more preferably less than about 0.5 weight percent. In still another preferred embodiment, the second distillation step is conducted under conditions to lower the formaldehyde content of the effluent to less than about 3 weight percent, preferably less than about 1 weight percent and more preferably less than about 0.5 weight percent and even more preferably 0.1 weight percent.

In one embodiment, at least a portion or substantially all of the caustic is added to the effluent during the second distillation step. In such an embodiment, the effluent may be transferred directly from the first distillation equipment (e.g. rotary vacuum evaporator) to the equipment associated with the second distillation (e.g. conventional batch distillation) followed by the addition of caustic. Alternatively, a portion of the caustic may be added during transfer of the effluent from the first distillation to the second distillation with the remaining caustic added during the second distillation step. Combining the steps of caustic addition and secondary distillation can be particularly useful for embodiments using batch distillation for the second distillation step. In yet another embodiment, caustic is added to the effluent prior to the second distillation step. Such timing may be more suitable when utilizing continuous distillation for the second distillation step.

In another embodiment, the first and second distillation steps are both conducted in a continuous steam distillation column with effluent being introduced from the top of the column and flowing downward in counter flow with rising steam such that the first distillation step occurs at the upper portion of the column followed by the second distillation step at the lower portion of the column. In this manner, the second distillations step is conducted at higher temperature than the first distillation. In such an embodiment, caustic may be added during the first and/or second distillation steps, and/or as an intermediate step.

In one embodiment, catalyst and/or spent catalyst may be filtered from the effluent after the addition of caustic but prior to the second distillation step. In another embodiment, the chloromethylated vinyl aromatic polymer product is separated from the effluent prior to the step of deactivating at least a portion of the catalyst. While less preferred, in several embodiments, the step of deactivating the catalyst and/or the first distillation step are not practiced. In such embodiments, the subject method may simply comprise the steps of adding caustic to the effluent followed by distillation under the conditions to remove a majority portion of the volatile organic originally present in the effluent (prior to distillation).

While not wishing to be bound by theory, it is believed that the addition of caustic may render the non-volatile organics remaining in the bottoms of distillation more hydrophilic and less prone to fouling. More specifically, it is believed that the hydroxyl groups of the caustic may substitute at least a portion of chlorine functional groups present in the organic tars, thus resulting in a more hydrophilic polymer material that is less prone to crosslinking and that can be removed from distillation equipment via conventional rinsing and filtering techniques. As a consequence, the second distillation of effluent can be operated under relatively higher temperatures resulting in a relatively higher removal of volatile organics from the effluent. The addition of caustic is also believed to reduce complex formation between residual ferric chloride (when used as a catalyst but not completely deactivated) and methanol (see Equation 10), which would otherwise increases methanol content remaining in the distillation bottoms.

$$3NaOH + FeCl_3 \cdot xCH_3OH \rightarrow 3NaCl + Fe(OH)_3 + xCH_3OH \qquad (10)$$

The addition of caustic is also believed to reduce the content of formaldehyde in the effluent via the Cannizzaro reaction. As formaldehyde forms an azeotrope with water, formaldehyde can be difficult to separate from aqueous solutions via distillation. The addition of caustic to the effluent is believed to react with formaldehyde in the formation of methanol and sodium formate as shown in Equation 11.

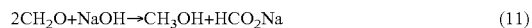

$$2CH_2O + NaOH \rightarrow CH_3OH + HCO_2Na \qquad (11)$$

The resulting methanol can be efficiently separate from the effluent during the second distillation step. Thus, a greater quantity of volatile organic can be removed from the effluent. It is further believed that the addition of caustic neutralizes hydrochloric acid, thus reducing the formation of methyl chloride which may otherwise form according to Equation 12.

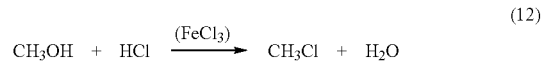

$$CH_3OH + HCl \xrightarrow{(FeCl_3)} CH_3Cl + H_2O \qquad (12)$$

Regardless of the actual mechanisms and reactions, laboratory scale experiments have shown that fouling can be reduced and often eliminated during distillation when effluent is pre-treated with caustic. That is, comparative experiments using substantially similar effluent compositions and distillation conditions have demonstrated a marked reduction in fouling as a result of pretreatment of effluent with caustic prior to distillation.

While principles of the invention are amenable to various modifications and alternatives forms, particular species have been described. It should be understood that the intent of this description is not to limit the invention to the particular embodiments described, but rather to cover all modifications, equivalents, and alternatives falling within the spirit and scope of the disclosure. The various embodiments of each individual step of the subject method may be combined with the various embodiments of other individual steps. For example, preferred embodiments of the step of catalyst deactivation may be combined with preferred embodiments of the first and/or second distillations along with various preferred embodiments of caustic addition. While most of the specification describes the subject method in terms of sequential steps, it should be appreciated that in some embodiments the individual steps of the method may substantially overlap and be conducted at the same time. For example, the step of catalyst deactivation and the first distillation step may partially overlap or be conducted substantially concurrently. Similarly, the addition of caustic may overlap with either the first or second distillation steps. Use of the terms "comprising", "comprises" and variations thereof are intended to be open-ended. Thus, elements, steps or features not expressly listed or described are not excluded.

The invention claimed is:

1. A method for processing effluent from a chloromethylation of a vinyl aromatic polymer wherein the effluent comprises catalyst and volatile organics, and wherein the method comprising the sequential steps of:
   1) deactivating at least a portion of the catalyst by adding at least one of the following constituents to the effluent: hydrochloric acid, methanol and water;
   2) conducting a first distillation of the effluent at a distillation temperature less than 80° C.;
   3) adding caustic to the effluent by adding an aqueous solution comprising sodium hydroxide to the effluent in sufficient quantity to raise the initial pH of the effluent to at least 5; and
   4) conducting a second distillation of the effluent;
wherein sequentially adjacent steps may overlap with one another or be conducted concurrently.

2. The method of claim 1 wherein:
   1) the step of deactivating at least a portion of the catalyst comprises adding an aqueous solution comprising from 1 to 40 weight percent hydrochloric acid to the effluent;
   2) the first distillation step is conducted at a distillation temperature less than 70° C.; and
   3) the step of adding caustic comprises adding a sufficient quantity to raise the initial pH of the effluent to at least 8.

3. The method of claim 1 wherein the second distillation step is conducted at a distillation temperature less than 110° C.

4. The method of claim 1 wherein the second distillation step is conducted at a distillation temperature above 80° C.

5. The method of claim 1 wherein the second distillation step is conducted under conditions to lower the total volatile organic content of the effluent to less than 10 weight percent.

6. The method of claim 1 wherein the volatile organics comprise methanol, and the second distillation step is conducted under conditions to lower the total methanol content of the effluent to less than 3 weight percent.

7. The method of claim 1 wherein the volatile organics comprise formaldehyde, and the second distillation step is conducted under conditions to lower the total formaldehyde content of the effluent to less than 3 weight percent.

8. The method of claim 1 wherein the catalyst is selected from a group comprising: aluminum chloride, zinc chloride, ferric chloride and ferric oxide; the volatile organics comprise at least one of: chloromethyl methyl ether (CMME), methylal, methanol, and formaldehyde; and caustic comprises at least one of: sodium hydroxide, potassium hydroxide and calcium hydroxide.

9. The method of claim 1 wherein the first distillation step comprises a multi-stage process comprising a first evaporation conducted at about standard atmospheric pressure and a temperature less than 60° C. followed by one or more subsequent evaporations conducted at a reduced pressure from about 10 to 90 kPa and temperature less than 60° C.

10. The method of claim 1 wherein the step of deactivating the catalyst and the first distillation step are conducted concurrently.

11. The method of claim 1 further comprising the step of filtering catalyst from the effluent after the addition of caustic but prior to the second distillation step.

12. A method for processing effluent from a chloromethylation of a vinyl aromatic polymer wherein the effluent comprises catalyst, methanol and chloromethyl methyl ether, and wherein the method comprises the sequential steps of:
   1) adding an aqueous solution of hydrochloric acid to deactivate at least a majority portion of the catalyst;
   2) distilling the effluent at a distillation temperature less than 80° C.;
   3) adding an aqueous solution of sodium hydroxide to the effluent in sufficient quantity to raise the initial pH of the effluent to at least 8; and
   4) distilling the effluent at a distillation temperature above 80° C.;
wherein sequentially adjacent steps may overlap with one another or be conducted concurrently.

13. The method of claim 12 wherein the aqueous solution of hydrochloric acid used to deactivate the catalyst is produced from a production of chloromethyl methyl ether.

* * * * *